United States Patent
Skillings et al.

(10) Patent No.: US 9,406,289 B2
(45) Date of Patent: Aug. 2, 2016

(54) TRACK TRAPPING AND TRANSFER

(71) Applicant: JamHub Corporation, Whitinsville, MA (US)

(72) Inventors: Steve Skillings, Whitinsville, MA (US); John Kasha, Simi Valley, CA (US)

(73) Assignee: JAMHUB CORPORATION, Westborough, MA (US)

( * ) Notice: Subject to any disclaimer, the term of this patent is extended or adjusted under 35 U.S.C. 154(b) by 0 days.

(21) Appl. No.: 14/654,105

(22) PCT Filed: Dec. 20, 2013

(86) PCT No.: PCT/US2013/076789
§ 371 (c)(1),
(2) Date: Jun. 19, 2015

(87) PCT Pub. No.: WO2014/100531
PCT Pub. Date: Jun. 26, 2014

(65) Prior Publication Data
US 2015/0348524 A1    Dec. 3, 2015

Related U.S. Application Data

(60) Provisional application No. 61/740,803, filed on Dec. 21, 2012.

(51) Int. Cl.
*G10H 7/00* (2006.01)
*G10H 1/00* (2006.01)
*H04L 29/06* (2006.01)

(52) U.S. Cl.
CPC .............. *G10H 7/00* (2013.01); *G10H 1/0033* (2013.01); *G10H 1/0058* (2013.01); *H04L 65/403* (2013.01); *G10H 2220/106* (2013.01); *G10H 2240/175* (2013.01)

(58) Field of Classification Search
CPC ............................. G10H 7/00; G10H 2240/175
USPC ........................................................... 84/601
See application file for complete search history.

(56) References Cited

U.S. PATENT DOCUMENTS

| | | | | |
|---|---|---|---|---|
| 5,964,836 A * | 10/1999 | Rowe | ..................... | G06F 9/4443 709/221 |
| 6,182,129 B1 * | 1/2001 | Rowe | ................ | G06F 17/30899 707/E17.119 |
| 6,728,932 B1 * | 4/2004 | Chundi | ............... | G06F 17/3071 707/999.002 |
| 8,653,349 B1 * | 2/2014 | White | .................. | G10H 1/0025 381/119 |
| 2001/0018711 A1 * | 8/2001 | Morris | ..................... | H04L 29/06 709/229 |
| 2002/0091847 A1 * | 7/2002 | Curtin | ..................... | H04M 3/56 709/231 |
| 2003/0164084 A1 * | 9/2003 | Redmann | ............. | G10H 1/0058 84/615 |
| 2004/0024478 A1 * | 2/2004 | Hans | .................... | G10H 1/0058 700/94 |

(Continued)

FOREIGN PATENT DOCUMENTS

JP    3185420    7/2001

*Primary Examiner* — David Warren
(74) *Attorney, Agent, or Firm* — Occhiuti & Rohlicek LLP (57) ABSTRACT

An apparatus includes an input for receiving session tracks, an audio converter for converting the first and second data into one of a plurality of audio formats, thereby generating converted session tracks; a storage medium for storing the converted session tracks; a session-track vectorization unit for packaging the converted session tracks into a session vector for transmission to the distributed music collaboration system, and a session-track transfer unit for effecting transfer of the session vector to the distributed music collaboration system.

11 Claims, 6 Drawing Sheets

(56) References Cited

U.S. PATENT DOCUMENTS

| | | | |
|---|---|---|---|
| 2006/0112814 A1* | 6/2006 | Paepcke | G10H 1/0066 84/645 |
| 2007/0028750 A1* | 2/2007 | Darcie | G10H 1/0058 84/625 |
| 2007/0039449 A1* | 2/2007 | Redmann | G10H 1/0058 84/609 |
| 2007/0140510 A1* | 6/2007 | Redmann | G10H 1/0058 381/97 |
| 2008/0097980 A1* | 4/2008 | Sullivan | G06Q 30/0246 |
| 2008/0190271 A1* | 8/2008 | Taub | G10H 1/0058 84/645 |
| 2009/0068943 A1* | 3/2009 | Grandinetti | G10H 1/0083 455/3.06 |
| 2009/0164034 A1* | 6/2009 | Cohen | G10H 1/0025 700/94 |
| 2009/0282967 A1* | 11/2009 | Skillings | G10H 1/0058 84/742 |
| 2010/0013643 A1* | 1/2010 | Lontka | H04R 27/00 340/577 |
| 2010/0105325 A1* | 4/2010 | Halla | H04S 3/00 455/41.2 |
| 2010/0235908 A1* | 9/2010 | Eynon | G06F 21/552 726/22 |
| 2010/0235909 A1* | 9/2010 | Eynon | G06F 21/552 726/22 |
| 2010/0319518 A1* | 12/2010 | Mehta | G10H 1/0058 84/625 |
| 2010/0326256 A1* | 12/2010 | Emmerson | G10H 1/0025 84/610 |
| 2012/0203364 A1* | 8/2012 | Redmann | G11B 20/00855 700/94 |
| 2012/0254388 A1* | 10/2012 | Duxbury | G06F 17/30598 709/223 |
| 2013/0238999 A1* | 9/2013 | Helms | G06F 3/165 715/727 |
| 2014/0000438 A1* | 1/2014 | Feis | G10G 1/00 84/453 |
| 2014/0040119 A1* | 2/2014 | Emmerson | G10H 1/0025 705/39 |
| 2014/0189525 A1* | 7/2014 | Trevisiol | G06F 17/30 715/745 |
| 2015/0154562 A1* | 6/2015 | Emmerson | G06Q 10/101 705/59 |
| 2015/0229679 A1* | 8/2015 | Skillings | G06Q 10/06 707/608 |

* cited by examiner

TRACK TRAPPING AND TRANSFER

CROSS REFERENCE TO RELATED APPLICATIONS

This application is the National Phase under 35 USC 371 of International Application No. PCT/US2013/076789, which claims the benefit of the priority date of U.S. Provisional Application No. 61/740,803, filed Dec. 21, 2012. The contents of the aforementioned applications are incorporated herein in their entirety.

FIELD OF DISCLOSURE

This disclosure relates to capturing analog audio from musical instruments and microphones for storage and re-distribution.

BACKGROUND

Data representative of music has long been editable on a computer. Music editors for this function are capable of starting with raw files and processing them to create various mixes. A difficulty that arises however is that of capturing performed music on a track-by-track basis for further processing.

In general, effective editing of audio requires discrete tracks, with one track for each music source. For example, a performance by a four piece band with three singers would preferably be saved in seven discrete tracks, one for each music source. This track-by-track storage facilitates mixing by a sound editor.

Known audio-capture devices for track-based capture are typically integrated with a complete mixing console that is operated by a sound engineer at the site of the performance. A complete mixing console is an expensive, large, and unwieldy apparatus that requires considerable training to operate correctly.

SUMMARY

The invention features a stand-alone portable apparatus that allows audio to be captured in discrete tracks for later editing.

In one aspect, the invention features an apparatus for providing a distributed music collaboration system with a session vector including session tracks associated with a session, each of the session tracks containing data representative of music created by a music source during the session. Such an apparatus includes an input for receiving the session tracks, an audio converter for converting the first and second data into one of a plurality of audio formats, thereby generating converted session tracks, a storage medium for storing the converted session tracks, a session-track vectorization unit for packaging the converted session tracks into a session vector for transmission to the distributed music collaboration system, and a session-vector transfer unit for effecting transfer of the session vector to the distributed music collaboration system.

In one embodiment, the session-vector transfer unit is configured to modulate an electromagnetic wave to carry information representative of the session vector. Among these embodiments are those in which the session-vector transfer unit includes a transmission line interface and is further configured to launch the modulated electromagnetic wave onto the transmission line for transmission to the distributed music collaboration system. In another embodiment, the session-vector transfer unit includes a free-space electrical interface and is configured to generate current on the free-space electrical interface to launch the modulated electromagnetic wave for transmission to the distributed music collaboration system.

In additional embodiments, the input is configured to connect to a session hub for receiving data from music sources and to retrieve session tracks from the session hub.

Among the embodiments are those in which the input includes a plurality of jacks, each of which receives one session track from one music source.

Yet other embodiments include those having an input level indicator to indicate whether audio input is within an optimal dynamic range, and those having a status indicator to indicate presence or absence of a connection to the distributed music collaboration system.

The invention also includes an apparatus having any combination of some of all the foregoing features.

These and other features of the invention will be apparent from the following detailed description and the accompanying figures, in which:

DETAILED DESCRIPTION

Figure 1:
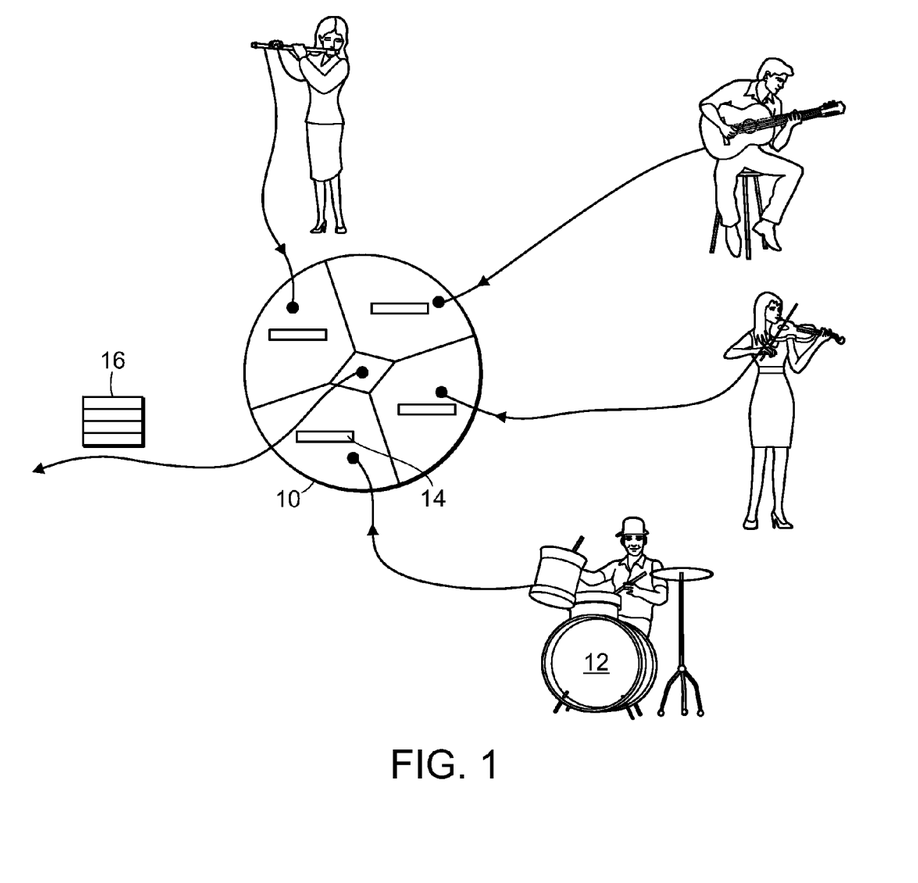
FIG. 1 shows a session hub with its output session vector.

Groups of musicians often come together to rehearse at a "session." A session hub 10, shown in FIG. 1 and described in U.S. Patent Publ. 2009/0282967, the contents of which are herein incorporated by reference, accepts input from a musician 12 and generates one or more tracks 14 corresponding to what that musician played during a session. Each of these tracks 14 is referred to herein as a "session track." In a typical session, there will be multiple session tracks 14.

The set of session tracks 14 concurrently obtained during a particular session defines a "session vector 16." The number of elements in the session vector 16 is greater than or equal to the number of musicians. Each session vector 16 contains data representative of music played by one or more of the musicians.

Figure 2:
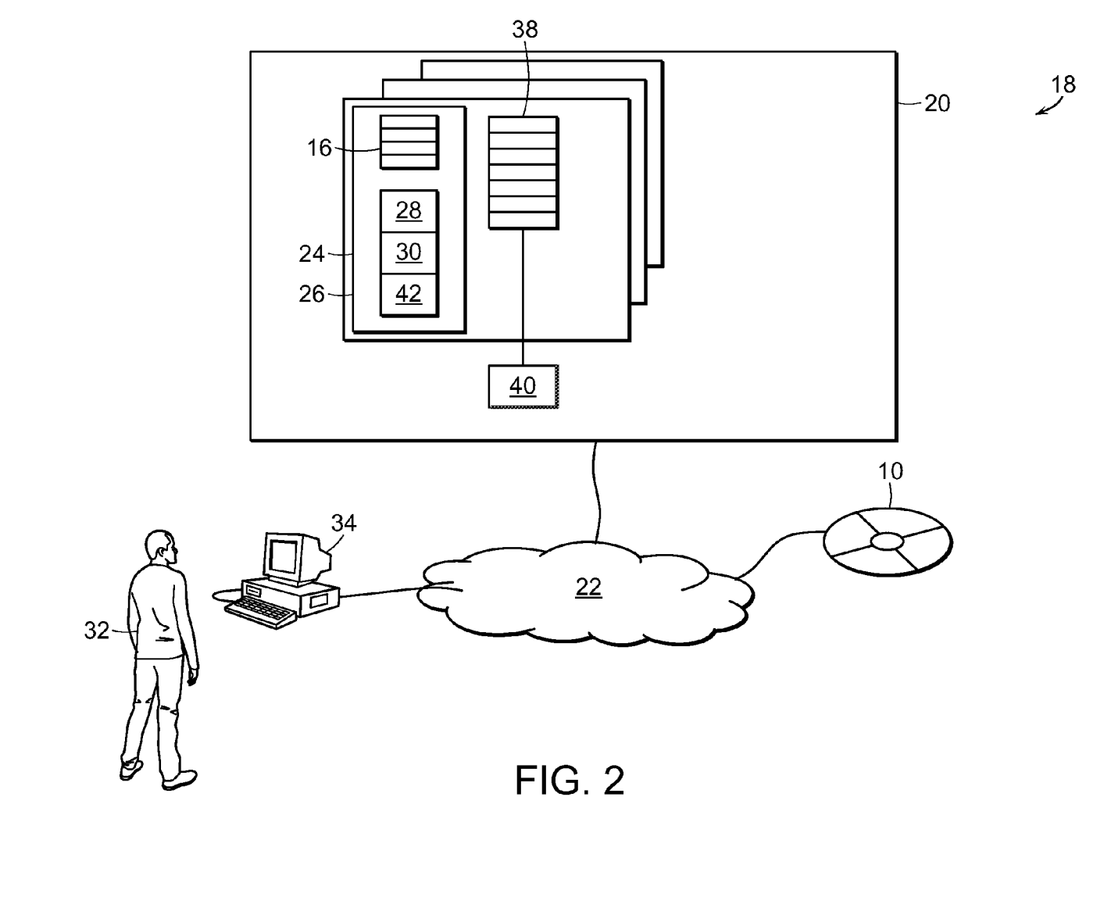
FIG. 2 shows a collaboration system to which the session hub of FIG. 1 is connected.

Referring now to FIG. 2, a distributed music collaboration system 18 features a server 20 remotely connected to the session hub 10 via a wide area network 22. The server 20 receives session vectors 16 from the session hub 10 and creates session data 24 that includes, in addition to the session vectors 16, session metadata 26. The session metadata 26 includes server-generated metadata 28 and user-generated metadata 30.

Figure 8:
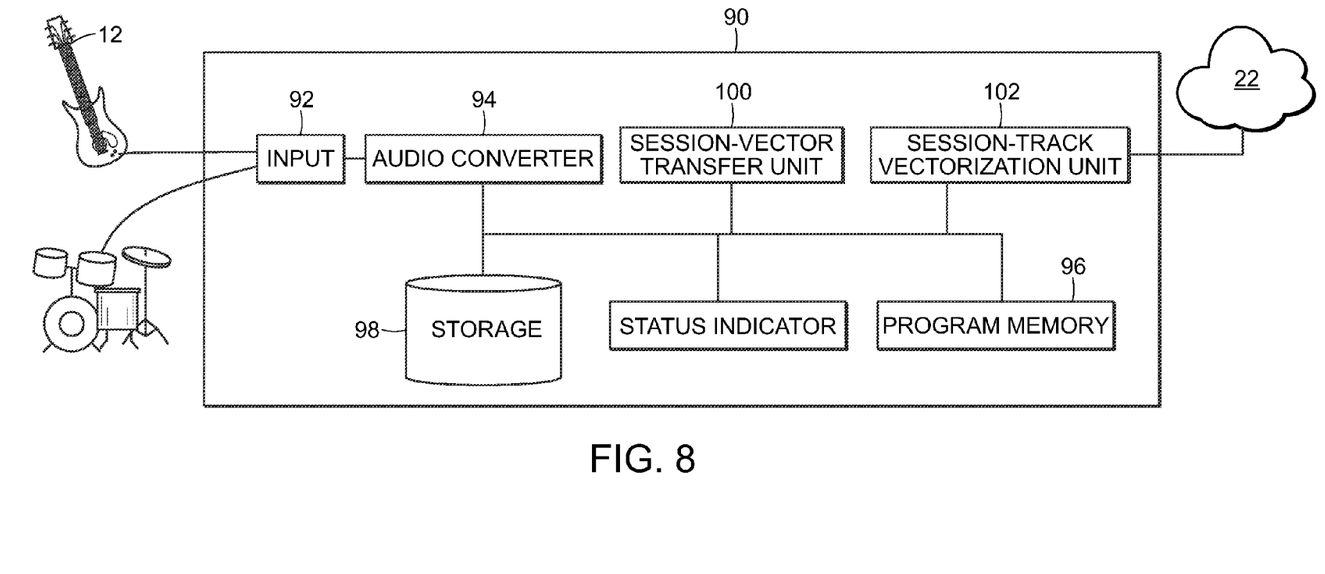
FIG. 8 shows a trapper for providing session vectors to the collaboration system of FIG. 2.

To provide more convenient communication with the music collaboration system 18, one embodiment of a session hub 10 connects to a track trapper 90 shown in FIG. 8 that captures multiple session tracks of analog audio and converts them into a selected digital audio format.

The illustrated track trapper 90 includes a multi-track input interface 92 having a variety of input receptacles for receiving analog session tracks. Examples of input receptacles include those that accommodate DB 25 jacks, TS and TRS jacks, both in eighth inch and quarter inch diameters, XLR jacks, USB jacks and mini-jacks, Thunderbolt jacks, and DisplayPort jacks. Embodiments of an input interface 92 include $2^n$-track interfaces for n=1 to 4. Other embodiments include $2^n$-track interfaces for n=5 to 6. In fact, there is no particular upper limit on the number of inputs.

The input interface 92 provides analog audio to an audio converter 94 having access to a program memory 96 that includes software for converting the analog audio into any one of a plurality of digital audio formats selected by the user. After converting the audio into a suitable digital format, the audio converter 94 causes it to be stored in a storage medium 98 as separate converted session tracks 14. The storage medium 98 can be a permanent on-board storage medium or a removable storage medium, such as an SD card, a removable hard-drive, a removable solid-state memory, or any combination of the foregoing.

A session track vectorization unit 100 retrieves the converted session tracks 14, combines them into a session vector 16, and provides the session vector 16 to a session vector transfer unit 102 for transmission to the music collaboration system 18, typically by modulating an electromagnetic wave to carry information representative of the session vector 16.

The session vector transfer unit 102 includes a network interface for providing communication with a wide-area network, via either a transmission line interface, such as an Ethernet cable, or a free-space electrical interface, such as a WiFi interface for launching the modulated electromagnetic wave for transmission to the distributed music collaboration system.

A status indicator 104 includes an interface, such as LEDs or a screen, that indicates the operating status of the trapper 90 such as whether it is connected to a network, whether it is transmitting data, whether its memory is close to full, the extent of remaining charge in a battery, for those embodiments that have a battery as a power source, whether the input dynamic range is within acceptable limits, and any combination of the foregoing.

When connected to the session hub 10, the input interface 92 of the track-trapper 90 connects to buses within the session hub 10, each of which carries a track associated with a particular music source 12. In other embodiments, the input interface includes inputs that can be connected directly to individual music sources 12 without the need for a separate session hub 10. Examples of music sources 12 to which the input interface 92 connects are the output of a mixing board, or instrument cables and/or microphones associated with individual musicians. Using this feature in conjunction with a WiFi network, the track-trapper 90 can capture a live performance and stream it in essentially real-time to the distributed music collaboration system 18. A sound editor can then quickly carry out suitable editing and mixing steps and create an audio file of the performance for wireless distribution and/or sale shortly after the end of the performance at the site of the performance itself.

Server-generated metadata 28 includes the date and time of the session, and if available, the identities of the musicians participating in the session. User-generated metadata 30 is provided by one or more users 32 accessing the collaboration system 18 using one of a corresponding plurality of clients 34. Such a user 32 generally maintains an account with the collaboration system 18. Through such an account, the user 32 can access session data 24 and create, alter, inspect or otherwise manipulate user-generated metadata 30.

One way for a user 32 to create user-generated metadata 30 is to perform custom editing or mixing of the session vectors 16. For example, a user 32 may want to alter relative volumes of session tracks 14, either in their entirety or within selected sections. Or the user 32 may want to alter the underlying time base either entirely or in sections, thus manipulating the tempo of the music. Or a user 32 may wish to cut and paste selected portions of session tracks 14.

Rather than alter the underlying session vector 16, the user's various editing and mixing commands are saved as a session transform 38. A filtering streamer 40 accepts a session transform 38 and a session vector 16 as inputs and outputs audio that can be listened to at a user's client 34.

A user 32 who wishes to hear the music as it was recorded during the session causes the filtering streamer 40 to accept that session vector 16 as a first input, and uses an identity session transform 38 as a second input. This results in the original music being streamed to the client 34. On the other hand, a user 32 who wishes to hear the result of his own editing and mixing or that carried out by another, specifies the session vector 16 as a first input and a particular session transform 38 as the second input. This causes the filtering streamer 40 to stream, to the client 34, the music from that session as modified by the selected session transform 38.

A user 32 can create several different session transforms 38 corresponding to different mixes. In doing so, the session vector 16 serves as a common foundation for all the different mixes. In addition, a user 32 can authorize other users to listen to the session vector 16 as modified by any session transform 38 by, for example, sending a link either to the session transform 38 or to a filtering streamer 40 having the appropriate session vector 16 and session transform 38 as inputs.

In addition to session transforms 38, session metadata 26 can also include annotations 42 linked to specified time points or time intervals in one or more session tracks 14 of a session vector 16. A user 32 on one client 34 can thus make comments pertaining to a particular session track 14 or portion thereof. These comments are saved as user-generated metadata 30 available to a user's collaborator. The collaborator may then add his own comments either in response to the user's comments or pertaining to another session track 14 or portion thereof.

The collaboration system 18 described herein thus permits a musician to collaborate with other musicians in connection with a session and to do so without creating multiple edited copies of the session data 24.

Figure 3:
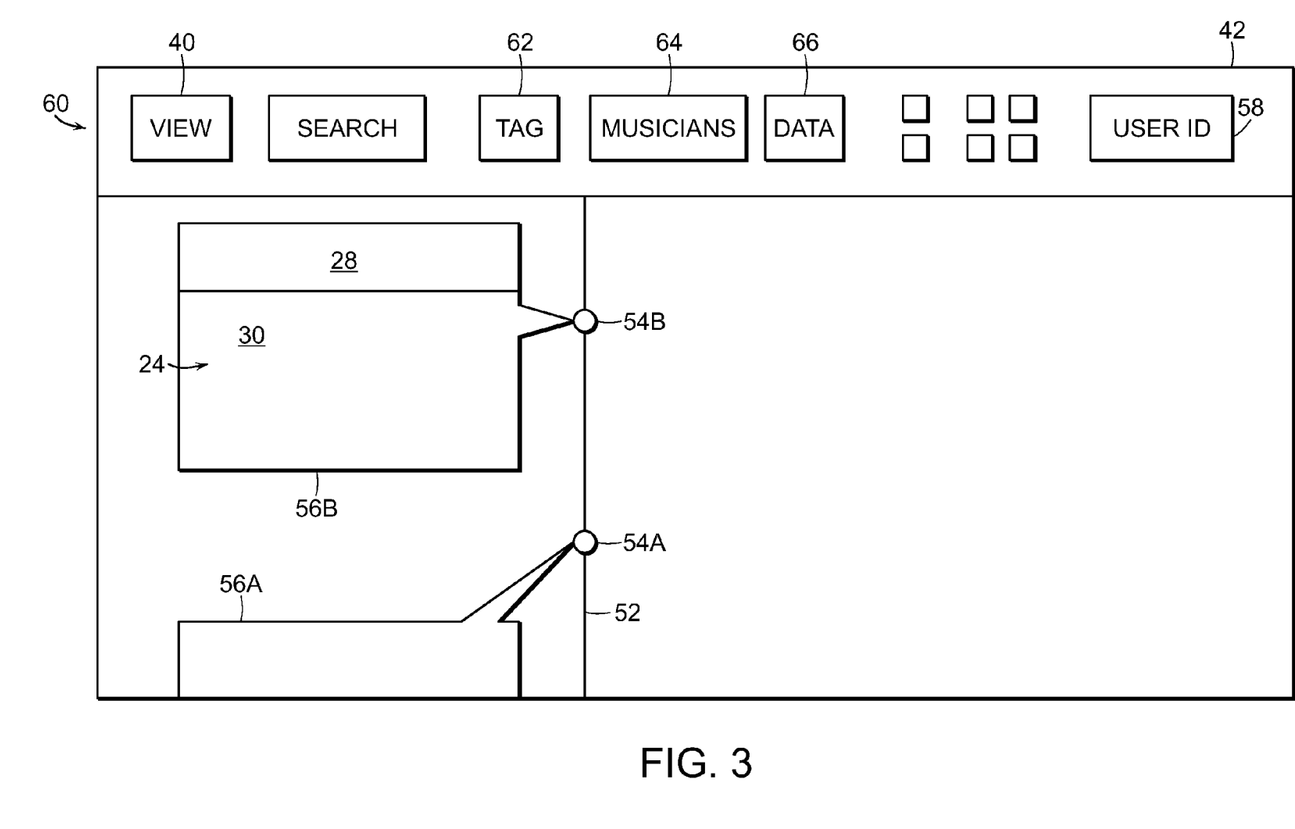
FIG. 3 shows a time-line view of a user-interface for the collaboration system of FIG. 2.

A representative user-interface encountered by a user 32 who accesses a server hosting the collaborative music system 18 is shown in FIG. 3. The user-interface includes a view button 40 that allows the user 32 to switch between different views. These views include a time-line view 42, shown in FIG. 3, an annotation view 44, shown in FIG. 4, a mixing view 46, shown in FIG. 5, an editing view 48, shown in FIG. 6, and a human-readable music view 50, shown in FIG. 7.

The time-line view 42, shown in FIG. 3, features a scrollable time-line 52 having nodes 54A-54B corresponding to each session that the user 32 is authorized to access. These nodes 54A, 54B are ordered by the time at which the session occurred. Each node 54A-54B is associated with a metadata field 56A, 56B showing the metadata 24 associated with that session. A metadata field 56A in some embodiments appears when a user 32 clicks on or hovers over its corresponding node 54A. The user's identity is identified in a user-ID field 58 at the top of the time-line view 42. A top row 60 of the time-line view 42, as well as the other views, features three buttons that reveal corresponding metadata for a currently selected session. These buttons include a first button 64 for accessing a list of musicians associated with the session, a second button 62 for accessing user-generated metadata, and a third button 66 for accessing server-generated metadata.

Clicking the first button 64 causes display of a window that shows musicians associated with the session and invites the user 32 to modify the information. Information concerning musicians can be tied to an account associated with the musician. However, this need not be the case.

Clicking the second button 62 causes display of a window that shows tags associated with the selected session and invites the user 32 to edit or add searchable information about the session. For example, the user 32 may enter information identifying the genre, or the key, or the names and/or composers of songs rehearsed during the session.

Clicking the third button 66 causes display of a window that shows date and time stamps, file size, and similar server-generated data that is also user searchable.

Figure 4:
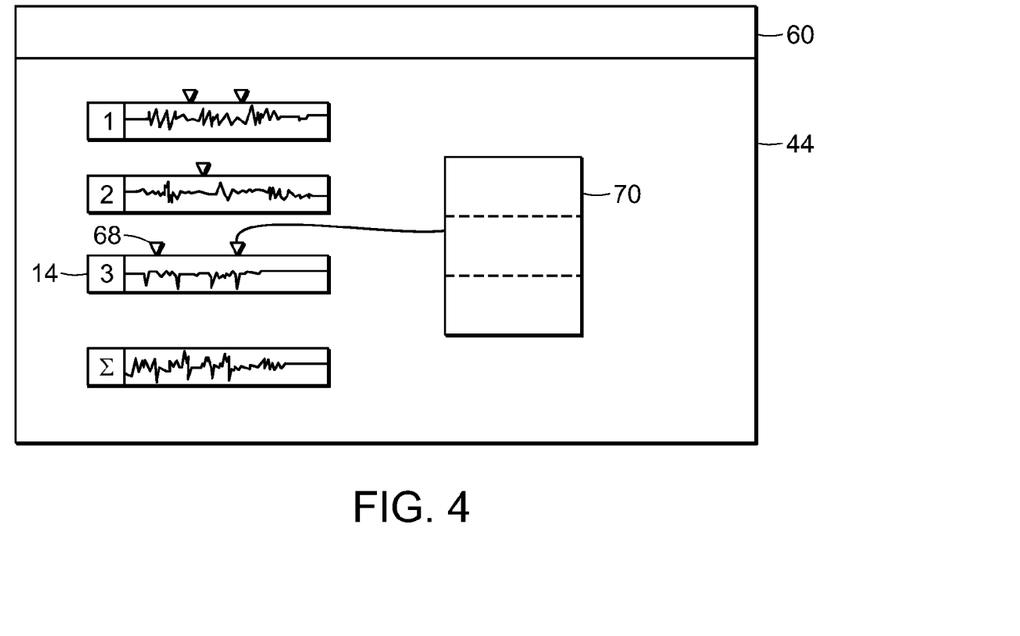
FIG. 4 shows an annotation view of a user-interface for the collaboration system of FIG. 2.

The annotation view 44, shown in FIG. 4, provides features to facilitate collaboration with other users. In the annotation view 44, a portion of the window shows session tracks 14, or combinations thereof, in graphical form. The user 32 can introduce marker points 68 to mark selected points in one or more session tracks 14. In the illustrated interface, these marker points 68 are triangles having a vertex resting on the graphical representation of the session track 14. The location of the marker point 68 indicates the time relative to some fixed point in the session track 14, which is usually the beginning of the session track 14.

Associated with each marker point 68 is an annotation window 70 in which the user 32 can enter his observations about the session track 14, both for himself and to share with other users. Upon clicking on a marker point 68, the annotation window 70 opens and reveals any comments either by the user or by his collaborators. In some embodiments, the annotation window 70 has different colors corresponding to different collaborating users.

A useful feature in certain embodiments is a play-loop that enables a relevant portion of the session track 14 to be played so that a comment concerning that portion can be readily understood in its musical context.

Figure 5:
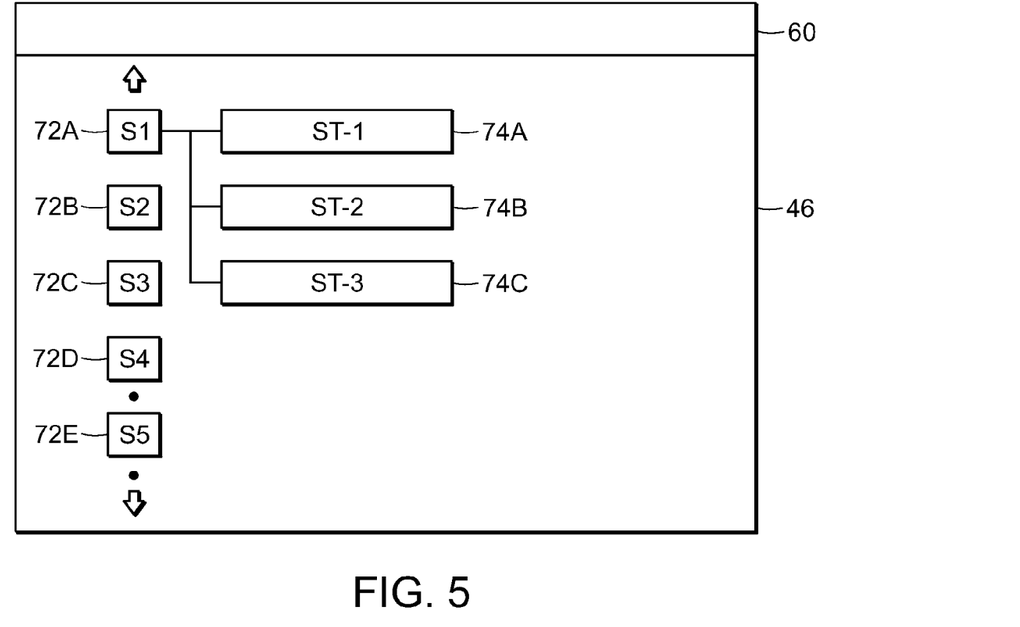
FIG. 5 shows a mixing view of a user-interface for the collaboration system of FIG. 2.

The mixing view 46, shown in FIG. 5, provides a way to see, for each of several sessions 72A-72E the various session transforms 74A-74C that have been saved by the user 32 or by his collaborators. In the particular example shown, three session transforms 74A-74C have been saved for the first session 72A. When the user 32 selects a session transform 74A, the server 20 passes the session tracks 14 and the selected session transform 74A to the filtering streamer 40 to be streamed to the user 32.

Figure 6:
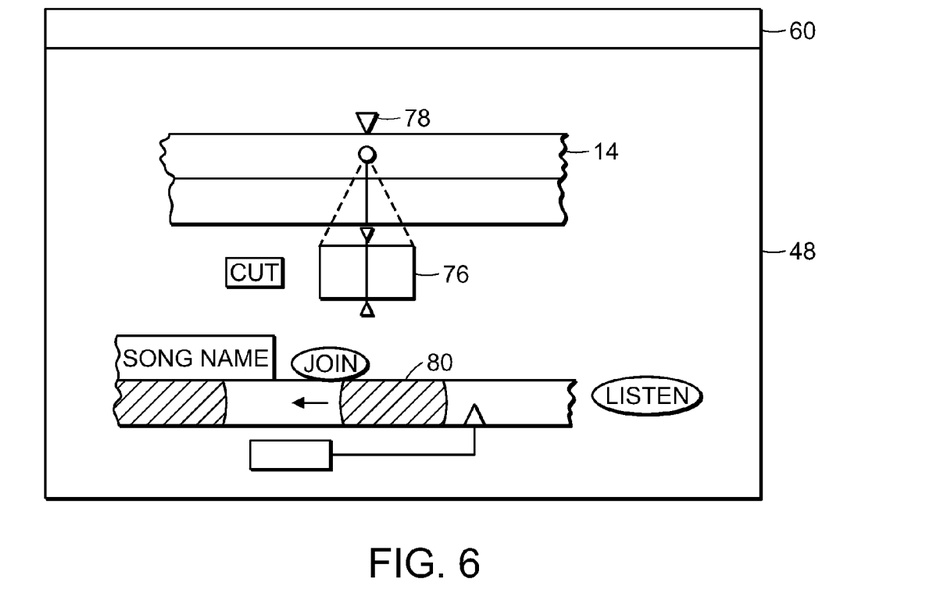
FIG. 6 shows an editing view of a user-interface for the collaboration system of FIG. 2.

The editing view 48, shown in FIG. 6, provides an interface to enable users to cut, copy, and paste selections 76 within and between session tracks 14, play, pause, fast forward, rewind, or otherwise position a play head 78, and change levels within a specified interval 80, either overall or for selected frequencies.

Figure 7:
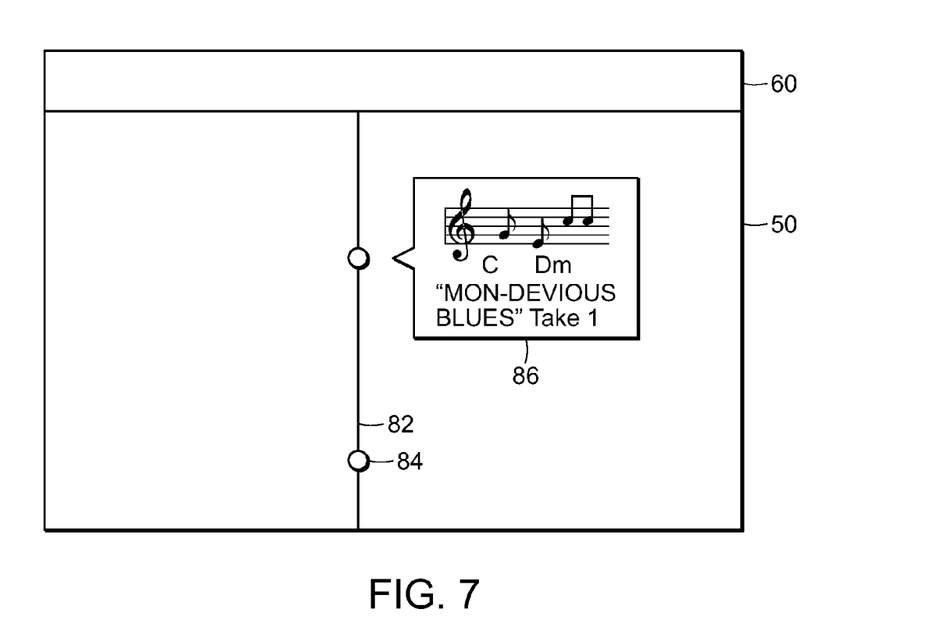
FIG. 7 shows a music view of a user-interface for the collaboration system of FIG. 2.

The music view 50, shown in FIG. 7, includes a scrollable-time-line 82 similar to that shown in the time-line view 42 in which each node 84 corresponds to a session track 14. In this view, clicking on a node 84 causes display of a window 86 showing a title, lyrics, notes, or chords associated with the session track 14.

The principles described herein, and the advantages thereof, are also applicable to the case in which no network is contemplated. For example, when implemented on a stand-alone system, a user can experiment with different mixes on the fly in the same manner described above by applying user-generated metadata to existing session data.

Having described the invention and a preferred embodiment thereof, what we claim as new and secured by Letters Patent is:

1. An apparatus for communicating with a distributed music collaboration system, said apparatus comprising a track trapper configured for providing said distributed music collaboration system with a session vector comprising session tracks associated with a session, each of said session tracks containing data representative of music created by a music source during said session, said track trapper including an input for receiving said session tracks, an audio converter for converting first and second data from corresponding first and second session tracks into one of a plurality of audio formats, thereby generating converted session tracks, a storage medium for storing said converted session tracks, a session-track vectorization unit for packaging said converted session tracks into a session vector for transmission to said distributed music collaboration system, and a session-vector transfer unit for effecting transfer of said session vector to said distributed music collaboration system.

2. The apparatus of claim 1, wherein said session-vector transfer unit is configured to modulate an electromagnetic wave to carry information representative of said session vector.

3. The apparatus of claim 2, wherein said session-vector transfer unit comprises a transmission line interface, said session-vector transfer unit being further configured to launch said modulated electromagnetic wave onto said transmission line for transmission to said distributed music collaboration system.

4. The apparatus of claim 2, wherein said session-vector transfer unit comprises a free-space electrical interface, said session-vector transfer unit being further configured to generate current on said free-space electrical interface to launch said modulated electromagnetic wave for transmission to said distributed music collaboration system.

5. The apparatus of claim 1, wherein said input is configured to connect to a session hub for receiving data from music sources, and to retrieve session tracks from said session hub.

6. The apparatus of claim 1, wherein said input comprises a plurality of jacks, each of which receives one session track from one music source.

7. The apparatus of claim 1, further comprising an input level indicator to indicate whether audio input is within an optimal dynamic range.

8. The apparatus of claim 1, further comprising a status indicator to indicate presence or absence of a connection to said distributed music collaboration system.

9. The apparatus of claim 1, wherein said input is an analog input for receiving analog session tracks.

10. The apparatus of claim 1, wherein said audio converter is configured to receive analog audio and to convert said analog audio into digital format.

11. The apparatus of claim 1, further comprising a battery readout for indicating power available for powering said track trapper.

\* \* \* \* \*